United States Patent
Long et al.

(10) Patent No.: US 12,204,691 B2
(45) Date of Patent: *Jan. 21, 2025

(54) METHOD AND APPARATUS FOR MODULATING HAPTIC FEEDBACK

(71) Applicant: Ultrahaptics IP Ltd, Bristol (GB)

(72) Inventors: Benjamin John Oliver Long, Bristol (GB); Thomas Andrew Carter, Bristol (GB); Sriram Subramanian, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,354

(22) Filed: Apr. 23, 2023

(65) Prior Publication Data

US 2023/0259213 A1    Aug. 17, 2023

Related U.S. Application Data

(63) Continuation of application No. 18/060,525, filed on Nov. 30, 2022, now Pat. No. 11,656,686, which is a
(Continued)

(30) Foreign Application Priority Data

Sep. 9, 2014    (GB) ...................... 1415923

(51) Int. Cl.
*G06F 3/01*      (2006.01)
*G06N 10/20*     (2022.01)
(Continued)

(52) U.S. Cl.
CPC ............. *G06F 3/016* (2013.01); *G06N 10/20* (2022.01); *G06N 10/80* (2022.01); *G08B 6/00* (2013.01); *G06F 3/011* (2013.01)

(58) Field of Classification Search
CPC .......... G06N 10/80; G06N 10/20; G08B 6/00; G06F 3/011; G06F 3/016
(Continued)

(56) References Cited

U.S. PATENT DOCUMENTS 4,218,921 A    8/1980    Berge
4,760,525 A    7/1988    Webb
(Continued)

FOREIGN PATENT DOCUMENTS

CA    2470115 A1    6/2003
CA    2909804 A1    11/2014
(Continued)

OTHER PUBLICATIONS

Office Action (Notice of Allowance and Fees Due (PTOL-85)) dated Feb. 11, 2022 for U.S. Appl. No. 16/228,760 (pp. 1-8).
(Continued)

*Primary Examiner* — Jack K Wang
(74) *Attorney, Agent, or Firm* — Koffsky Schwalb LLC; Mark I. Koffsky

(57)    ABSTRACT

The present invention concerns a method and apparatus for the modulation of an acoustic field for providing tactile sensations. A method of creating haptic feedback using ultrasound is provided. The method comprises the steps of generating a plurality of ultrasound waves with a common focal point using a phased array of ultrasound transducers, the common focal point being a haptic feedback point, and modulating the generation of the ultrasound waves using a waveform selected to produce little or no audible sound at the haptic feedback point.

30 Claims, 7 Drawing Sheets

Related U.S. Application Data continuation of application No. 17/645,305, filed on Dec. 20, 2021, now Pat. No. 11,768,540, which is a continuation of application No. 16/600,500, filed on Oct. 13, 2019, now Pat. No. 11,204,644, which is a continuation of application No. 15/966,213, filed on Apr. 30, 2018, now Pat. No. 10,444,842, which is a continuation of application No. 14/916,179, filed as application No. PCT/GB2015/052578 on Sep. 7, 2015, now Pat. No. 9,958,943.

(51) Int. Cl.
G06N 10/80 (2022.01)
G08B 6/00 (2006.01)

(58) Field of Classification Search
USPC .................................................. 340/407.2
See application file for complete search history.

(56) References Cited

U.S. PATENT DOCUMENTS

| | | | |
|---|---|---|---|
| 4,771,205 A | 9/1988 | Mequio | |
| 4,881,212 A | 11/1989 | Takeuchi | |
| 5,122,993 A | 6/1992 | Hikita | |
| 5,226,000 A | 7/1993 | Moses | |
| 5,235,986 A | 8/1993 | Maslak | |
| 5,243,344 A | 9/1993 | Koulopoulos | |
| 5,329,682 A | 7/1994 | Thurn | |
| 5,371,834 A | 12/1994 | Tawel | |
| 5,422,431 A | 6/1995 | Ichiki | |
| 5,426,388 A | 6/1995 | Flora | |
| 5,477,736 A | 12/1995 | Lorraine | |
| 5,511,296 A | 4/1996 | Dias | |
| 5,729,694 A | 3/1998 | Holzrichter | |
| 5,859,915 A | 1/1999 | Norris | |
| 6,029,518 A | 2/2000 | Oeftering | |
| 6,193,936 B1 | 2/2001 | Gardner | |
| 6,216,538 B1 | 4/2001 | Yasuda | |
| 6,436,051 B1 | 8/2002 | Morris | |
| 6,503,204 B1 | 1/2003 | Sumanaweera | |
| 6,647,359 B1 | 11/2003 | Verplank | |
| 6,771,294 B1 | 8/2004 | Pulli | |
| 6,772,490 B2 | 8/2004 | Toda | |
| 6,800,987 B2 | 10/2004 | Toda | |
| 7,107,159 B2 | 9/2006 | German | |
| 7,109,789 B2 | 9/2006 | Spencer | |
| 7,182,726 B2 | 2/2007 | Williams | |
| 7,225,404 B1 | 5/2007 | Zilles | |
| 7,284,027 B2 | 10/2007 | Jennings, III | |
| 7,345,600 B1 | 3/2008 | Fedigan | |
| 7,487,662 B2 | 2/2009 | Schabron | |
| 7,497,662 B2 | 3/2009 | Mollmann | |
| 7,577,260 B1 | 8/2009 | Hooley | |
| 7,692,661 B2 | 4/2010 | Cook | |
| RE42,192 E | 3/2011 | Schabron | |
| 7,966,134 B2 | 6/2011 | German | |
| 8,000,481 B2 | 8/2011 | Nishikawa | |
| 8,123,502 B2 | 2/2012 | Blakey | |
| 8,269,168 B1 | 9/2012 | Axelrod | |
| 8,279,193 B1 | 10/2012 | Birnbaum | |
| 8,351,646 B2 | 1/2013 | Fujimura | |
| 8,369,973 B2 | 2/2013 | Risbo | |
| 8,594,350 B2 | 11/2013 | Hooley | |
| 8,607,922 B1 | 12/2013 | Werner | |
| 8,782,109 B2 | 7/2014 | Tsutsui | |
| 8,823,674 B2 | 9/2014 | Birnbaum | |
| 8,833,510 B2 | 9/2014 | Koh | |
| 8,884,927 B1 | 11/2014 | Cheatham, III | |
| 9,208,664 B1 | 12/2015 | Peters | |
| 9,267,735 B2 | 2/2016 | Funayama | |
| 9,421,291 B2 | 8/2016 | Robert | |
| 9,612,658 B2 | 4/2017 | Subramanian | |
| 9,662,680 B2 | 5/2017 | Yamamoto | |
| 9,667,173 B1 | 5/2017 | Kappus | |
| 9,816,757 B1 | 11/2017 | Zielinski | |
| 9,841,819 B2 | 12/2017 | Carter | |
| 9,863,699 B2 | 1/2018 | Corbin, III | |
| 9,898,089 B2 | 2/2018 | Subramanian | |
| 9,936,908 B1* | 4/2018 | Acosta | A61B 5/0515 |
| 9,945,818 B2 | 4/2018 | Ganti | |
| 9,958,943 B2 | 5/2018 | Long | |
| 9,977,120 B2 | 5/2018 | Carter | |
| 10,101,811 B2 | 10/2018 | Carter | |
| 10,101,814 B2 | 10/2018 | Carter | |
| 10,133,353 B2 | 11/2018 | Eid | |
| 10,140,776 B2 | 11/2018 | Schwarz | |
| 10,146,353 B1 | 12/2018 | Smith | |
| 10,168,782 B1 | 1/2019 | Tchon | |
| 10,268,275 B2 | 4/2019 | Carter | |
| 10,281,567 B2 | 5/2019 | Carter | |
| 10,318,008 B2 | 6/2019 | Sinha | |
| 10,444,842 B2 | 10/2019 | Long | |
| 10,469,973 B2 | 11/2019 | Hayashi | |
| 10,496,175 B2 | 12/2019 | Long | |
| 10,497,358 B2 | 12/2019 | Tester | |
| 10,510,357 B2 | 12/2019 | Kovesi | |
| 10,520,252 B2 | 12/2019 | Momen | |
| 10,523,159 B2 | 12/2019 | Megretski | |
| 10,531,212 B2 | 1/2020 | Long | |
| 10,535,174 B1 | 1/2020 | Rigiroli | |
| 10,569,300 B2 | 2/2020 | Hoshi | |
| 10,593,101 B1 | 3/2020 | Han | |
| 10,599,434 B1 | 3/2020 | Barrett | |
| 10,657,704 B1 | 5/2020 | Han | |
| 10,685,538 B2 | 6/2020 | Carter | |
| 10,755,538 B2 | 8/2020 | Carter | |
| 10,818,162 B2 | 10/2020 | Carter | |
| 10,911,861 B2 | 2/2021 | Buckland | |
| 10,915,177 B2 | 2/2021 | Carter | |
| 10,921,890 B2 | 2/2021 | Subramanian | |
| 10,930,123 B2 | 2/2021 | Carter | |
| 10,943,578 B2 | 3/2021 | Long | |
| 10,991,074 B2 | 4/2021 | Bousmalis | |
| 11,048,329 B1 | 6/2021 | Lee | |
| 11,080,874 B1 | 8/2021 | Bardagjy | |
| 11,098,951 B2 | 8/2021 | Kappus | |
| 11,106,273 B2 | 8/2021 | Hazra | |
| 11,113,860 B2 | 9/2021 | Rigiroli | |
| 11,125,866 B2 | 9/2021 | Sumi | |
| 11,169,610 B2 | 11/2021 | Sarafianou | |
| 11,189,140 B2 | 11/2021 | Long | |
| 11,204,644 B2 | 12/2021 | Long | |
| 11,276,281 B2 | 3/2022 | Carter | |
| 11,350,909 B2 | 6/2022 | Maresca | |
| 11,531,395 B2 | 12/2022 | Kappus | |
| 11,543,507 B2 | 1/2023 | Carter | |
| 11,550,395 B2 | 1/2023 | Beattie | |
| 11,550,432 B2 | 1/2023 | Carter | |
| 11,553,295 B2 | 1/2023 | Kappus | |
| 11,693,113 B2 | 7/2023 | Bachmann | |
| 11,714,492 B2 | 8/2023 | Carter | |
| 11,715,453 B2 | 8/2023 | Kappus | |
| 11,727,790 B2 | 8/2023 | Carter | |
| 11,740,018 B2 | 8/2023 | Kappus | |
| 11,742,870 B2 | 8/2023 | Long | |
| 11,768,540 B2 | 9/2023 | Long | |
| 11,816,267 B2 | 11/2023 | Kappus | |
| 11,842,517 B2 | 12/2023 | Lyons | |
| 11,886,639 B2 | 1/2024 | Brown | |
| 11,921,928 B2 | 3/2024 | Iodice | |
| 11,955,109 B2 | 4/2024 | Long | |
| 2001/0007591 A1 | 7/2001 | Pompei | |
| 2001/0033124 A1 | 10/2001 | Norris | |
| 2002/0149570 A1 | 10/2002 | Knowles | |
| 2003/0024317 A1 | 2/2003 | Miller | |
| 2003/0144032 A1 | 7/2003 | Brunner | |
| 2003/0182647 A1 | 9/2003 | Radeskog | |
| 2004/0005715 A1 | 1/2004 | Schabron | |
| 2004/0014434 A1 | 1/2004 | Haardt | |
| 2004/0052387 A1 | 3/2004 | Norris | |
| 2004/0091119 A1 | 5/2004 | Duraiswami | |
| 2004/0210158 A1 | 10/2004 | Organ | |
| 2004/0226378 A1 | 11/2004 | Oda | |

(56) References Cited

U.S. PATENT DOCUMENTS

| | | |
|---|---|---|
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Shuki |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0271397 A1 | 10/2013 | MacDougall |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1* | 12/2016 | Ansari ............ B60W 60/0059 |
| 2016/0374562 A1 | 12/2016 | Vertikov |
| 2017/0002839 A1 | 1/2017 | Bukland |
| 2017/0004819 A1* | 1/2017 | Ochiai .................. G10K 15/02 |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1* | 5/2017 | Hoshi ....................... H04R 1/40 |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0249932 A1* | 8/2017 | Maxwell ............. H03H 9/6483 |

(56) References Cited

U.S. PATENT DOCUMENTS

| | | |
|---|---|---|
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0267156 A1 | 9/2018 | Carter |
| 2018/0271494 A1 | 9/2018 | Cuscuna |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0193269 A1 | 6/2020 | Park |
| 2020/0218354 A1 | 7/2020 | Beattie |
| 2020/0257371 A1 | 8/2020 | Sung |
| 2020/0294299 A1 | 9/2020 | Rigiroli |
| 2020/0302760 A1 | 9/2020 | Carter |
| 2020/0320347 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Long |
| 2021/0111731 A1 | 4/2021 | Long |
| 2021/0112353 A1 | 4/2021 | Kappus |
| 2021/0141458 A1 | 5/2021 | Sarafianou |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0275141 A1 | 9/2021 | Eckersley |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0000447 A1 | 1/2022 | Eibl |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0117919 A1 | 4/2023 | Iodice |
| 2023/0124704 A1 | 4/2023 | Buckland |
| 2023/0141896 A1 | 5/2023 | Liu |
| 2023/0168228 A1 | 6/2023 | Kappus |
| 2023/0215248 A1 | 7/2023 | Lowther |
| 2023/0228857 A1 | 7/2023 | Carter |
| 2023/0251720 A1 | 8/2023 | Wren |
| 2023/0298444 A1 | 9/2023 | Kappus |
| 2023/0360504 A1 | 11/2023 | Kappus |
| 2023/0368771 A1 | 11/2023 | Kappus |
| 2023/0378966 A1 | 11/2023 | Long |
| 2024/0021072 A1 | 1/2024 | Carter |
| 2024/0056655 A1 | 2/2024 | Page |
| 2024/0069640 A1 | 2/2024 | Long |
| 2024/0095953 A1 | 3/2024 | Lyons |
| 2024/0096183 A1 | 3/2024 | Carter |
| 2024/0129655 A1 | 4/2024 | Chilles |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| TW | 201308837 | 2/2013 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |

(56) References Cited

FOREIGN PATENT DOCUMENTS

| WO | 2010139916 | | 12/2010 |
|---|---|---|---|
| WO | 2011132012 | A1 | 10/2011 |
| WO | 2012023864 | | 2/2012 |
| WO | 2012104648 | A1 | 8/2012 |
| WO | 2013179179 | | 12/2013 |
| WO | 2014181084 | A1 | 11/2014 |
| WO | 2015006467 | | 1/2015 |
| WO | 2015039622 | | 3/2015 |
| WO | 2015127335 | | 8/2015 |
| WO | 2015194510 | | 12/2015 |
| WO | 2016007920 | | 1/2016 |
| WO | 2016073936 | | 5/2016 |
| WO | 2016095033 | A1 | 6/2016 |
| WO | 2016099279 | | 6/2016 |
| WO | 2016132141 | | 8/2016 |
| WO | 2016132144 | | 8/2016 |
| WO | 2016137675 | | 9/2016 |
| WO | 2016162058 | | 10/2016 |
| WO | 2016171651 | | 10/2016 |
| WO | 2017172006 | | 10/2017 |
| WO | 2018109466 | A1 | 6/2018 |
| WO | 2018168562 | A1 | 9/2018 |
| WO | 2019190894 | | 10/2019 |
| WO | 2020049321 | A2 | 3/2020 |
| WO | 2021130505 | A1 | 7/2021 |
| WO | 2021260373 | A1 | 12/2021 |
| WO | 2021262343 | | 12/2021 |

OTHER PUBLICATIONS

Office Action (Notice of Allowance and Fees Due (PTOL-85) dated Feb. 28, 2022 for U.S. Appl. No. 17/068,825 (pp. 1-7).
Office Action (Notice of Allowance and Fees Due (PTOL-85) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
"Flexible piezoelectric transducer for ultrasonic inspection of non-planar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In Data, pp. 130-141. 2018. (Year: 2018).
EPO Examination Report for EP19769198.3 (Jul. 11, 2023).
Examination Report for EP 17 826 539.3 (Aug. 2, 2023) (5 pages).
First Examination report for ndian Patent Application No. 202247024128 (Aug. 11, 2023) (6 pages).
ISR and WO for PCT/GB2023/050001 (May 24, 2023) (20 pages).
Montenegro et al., "Neural Network as an Alternative to the Jacobian for Iterative Solution to Inverse Kinematics," 2018 Latin

(56) References Cited

OTHER PUBLICATIONS

American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016).
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).

(56) References Cited

OTHER PUBLICATIONS

Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
Desilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).
EPO Examination Report 17 748 4656.4 (Jan. 12, 2021) (16 pages).
EPO Examination Search Report 17 702 910.5 (Jun. 23, 2021) 10 pages.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Notice of Allowance dated Dec. 21, 2018 for U.S. Appl. No. 15/983,864 (pp. 1-7).

(56) References Cited

OTHER PUBLICATIONS

Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for US App. No. 15/960, 113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023).

(56) References Cited

OTHER PUBLICATIONS

Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rakkolainen et al., A Survey of Mid-Air Ultrasound Haptics and Its Applications (IEEE Transactions on Haptics), vol. 14, No. 1, 2021.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https://doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" Wespac IX 2006 (8 pages).
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,, Curved acceleration path of ultrasound-driven air flow, J. Appl. Phys. 125, 054902 (2019).
Ken Wada, Ring Buffer Basics (2013).

(56) References Cited

OTHER PUBLICATIONS

Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adversarial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al.(2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.

(56) References Cited

OTHER PUBLICATIONS

Hilleges et al. Interactions in the air: adding further depth to interactive tabletops, UIST '09: Proceedings of the 22nd annual ACM symposium on User interface software and technologyOct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=gb (Accessed May 29, 2022).
Hua J, Qin H., Haptics-based dynamic implicit solid modeling, IEEE Trans Vis Comput Graph. Sep.-Oct. 2004;10(5):574-86.
Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/052122 (Oct. 18, 2023) 13 pages.
ISR and WO for PCT/GB2023/052612 (Mar. 7, 2024) 18 pages.
Ochiai, Cross-Field Aerial Haptics: Rendering Haptic Feedback in Air with Light and Acoustic Fields, CHI (Year: 2016) 10 pages.
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Notice of Allowance and Fees Due (PTOL-85)) dated Jan. 31, 2024 for U.S. Appl. No. 18/352,981 (pp. 1-6).
Schiefler, Generation and Analysis of Ultrasound Images Using Plane Wave and Sparse Arrays Techniques, Sensors (Year: 2018) 23 pages.

\* cited by examiner

METHOD AND APPARATUS FOR MODULATING HAPTIC FEEDBACK

FIELD OF THE INVENTION

The present invention concerns a method and apparatus for the modulation of an acoustic field for providing tactile sensations. More particularly, but not exclusively, this invention concerns a method and apparatus for the modulation of an acoustic field for providing tactile sensations in order to provide an improved user experience.

BACKGROUND

Various interactive haptic technologies exist, which provide a user or users with tactile information or feedback, often in combination with visual information displayed on an interactive screen. For example, previous haptic feedback devices include pins moving to physically change a deformable surface. A pen connected to an articulated arm may be provided, as in the SensAble PHANTOM device. Alternatively, a user may wear, for example in the form of a glove, one or more actuators which are activated to provide haptic feedback to a user. However, in each of these technologies, a user requires physical contact with a deformable surface, a pen, or a specially adapted glove. Such requirements reduce the usability and spontaneity with which a user may interact with a system.

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximise the acoustic radiation force exerted.

Ultrasound haptic feedback systems create a vibrotactile sensation upon the skin of a user of the system. The focused ultrasound creates enough force at the point of intersection to slightly displace the skin of a user. Typically, ultrasound haptic feedback systems use ultrasound with a frequency at or above 40 kHz, which is above the threshold for receptors in the skin to feel. Therefore, a user can only detect the onset and cessation of such focused ultrasound. In order to provide a sensation that is detectable by the receptors in skin, the focused ultrasound is modulated at a lower frequency, within the detectable range of the receptors. This range is typically from 1 Hz to 500 Hz.

A side effect of the modulation is that the ultrasound breaks down and creates a sound at the modulation frequency. Therefore, when creating tactile feedback with a 200 Hz modulation frequency, a 200 Hz sound is also produced. This audible sound may be annoying to users and is a barrier to ultrasound haptic technology being adopted.

The present invention seeks to mitigate the above-mentioned problems. Alternatively or additionally, the present invention seeks to provide an improved haptic feedback system.

SUMMARY OF THE INVENTION

The present invention provides, according to a first aspect, a method of creating haptic feedback using ultrasound comprising the steps of:

generating a plurality of ultrasound waves with a common focal point using a phased array of ultrasound transducers, the common focal point being a haptic feedback point, modulating the generation of the ultrasound waves using a waveform selected to produce little or no audible sound at the haptic feedback point.

The method may comprise the step of generating a plurality of common focal points, each common focal point being a haptic feedback point.

The production of little or no audible sound at a haptic feedback point is dependent on both the loudness of any sound produced, together with the frequency at which any sound is produced. A small amount of audible sound may be produced, and considered acceptable. The acceptability of the sound produced by the creation of haptic feedback may be dependent on the background noise audible at the haptic feedback point. In a noisy environment, the acceptable level of sound produced at the haptic feedback point may be greater than the acceptable level of sound produced in a quiet environment. Therefore, the intended use of the haptic feedback system creating the haptic feedback and the environment in which the system is located will determine the acceptable level of sound production.

At high intensities, ultrasound becomes non-linear. This non-linear behaviour allows the creation of haptic feedback but also causes the audible sound produced in haptic feedback systems. An example of the effect of the non-linearity of ultrasound waves is utilising the effect to create highly directive audible sound with parametric speakers. The sound is produced due to the second derivative of the $p^2$ term of the Westervelt equation.

$$\nabla^2 p + \frac{\delta}{c_0^4}\frac{\partial^3 p}{\partial t^3} + \frac{\beta}{\rho_0 c_0^4}\frac{\partial^2 p^2}{\partial t^2} - \frac{1}{c_0^2}\frac{\partial^2 p}{\partial t^2} = 0 \qquad \text{(Eq. 1)}$$

Where p is the sound pressure, which in the case of the invention is the difference between the instantaneous sound pressure at a point and the ambient sound pressure.

In the case of existing haptic feedback systems, a modulated phased array produces ultrasound modulated with a simple square wave pattern, i.e. the array is switched on and off at the modulation frequency. Therefore, the $p^2$ term is generating an approximate square wave at the focal point of the phased array with a frequency that matches the modulation frequency. The square wave generated by the non-linear breakdown of the ultrasound will create a relatively loud noise and is off putting to a user of such a haptic feedback system.

In order to reduce or eliminate the audible noise, the applicant has realised it is necessary to avoid sharp changes in sound pressure level throughout the acoustic field. These sharp changes in pressure, as demonstrated by the square wave example above, are turned into oscillations by the non-linear medium. By smoothing out the changes in sound pressure level, the sound produced may be reduced to a lower and/or inaudible level. The sound pressure may be continuously changed. The sound pressure may be continuously changed with the first derivative of the rate of change also being continuous. The sound pressure may be continuously changed with the second derivative of the rate of change being continuous. The maximum rate of change of sound pressure may be dependent on a number of factors, including the variability of threshold hearing of humans with frequency of sound waves, and factors such as the temperature and humidity of air in which the wave is being produced. The generation of haptic feedback may be "tuned" in order that any sound produced is suitably low for the intended use of the haptic feedback system.

Alternatively or additionally, the sound produced by the method may last only a very short time. As humans do not perceive sounds that last only very briefly, this can effectively make the sound produced inaudible.

One possible way of reducing the sound produced may be to avoid turning the transducers off, and therefore avoid the emission of acoustic energy rapidly switching between 0% and 100% as in a square wave modulation. The method may comprise the step of varying the position of the common focal point. The position of the common focal point may be constantly varied. The position of the common focal point may oscillate about a central focal point. For example, the phase delays of a phased array could be altered to defocus and refocus ultrasound to a feedback point at the modulation frequency. The sound pressure level emitted by an individual transducer in a phased array is small compared to the sound pressure level at the focal point, and so there will still be a large change in sound pressure at the focal point. Therefore, this solution may have a relatively small effect.

The method may comprise the step of avoiding sharp pressure changes at the focal point. The modulation may comprise selecting a waveform that is an interpolation of the transducer phases and amplitudes. The detailed description shows various interpolated waveforms and the waveforms that are produced at the focal point by the non-linear breakdown of the ultrasound. The waveforms may be interpolated between a fully on and fully off state. The interpolation curves may be generalised between any two transducer phase and amplitude configurations. The interpolation may be a linear interpolation. The interpolation may be a polynomial or trigonometric interpolation, such as a cosine interpolation. The interpolation may be a parametric speaker interpolation, arranged to result in a sinusoidal waveform being generated at the focal point. The parametric speaker interpolation may, for example, be according to the same equation as that used to encode a sinusoid into a parametric speaker beam to remove distortion. An example of such an equation can be found in Pompei (2002) "Sound from Ultrasound: The Parametric Array as an Audible Sound Source", Ph.D. MIT:US, Eq 3.9. The interpolated waveform may produce smoother waveforms at the focal point than the square wave modulation of the prior art.

The invention provides, according to a second aspect, a haptic feedback system comprising:

a phased array comprising a plurality of transducers arranged to emit ultrasound to create a haptic feedback point, the phased array arranged to emit ultrasound according to a modulation waveform having a shape that produces little or no sound when the ultrasound converges at the haptic feedback point.

The haptic feedback system may comprise a control unit. The haptic feedback system may comprise a driving unit. The driving unit may be arranged to drive the transducer to produce ultrasound. The control unit may be arranged to send control signals to the driving unit. The control unit may include a memory. The control unit may be arranged to modulate the output of the transducer according to a particular modulation waveform. The modulation waveform may be linear. The modulation waveform may be a polynomial or trigonometric interpolation, for example, a cosine interpolation. The modulation waveform may correspond to a parabolic speaker interpolation. The control unit may be a PC or other suitable computer device.

According to a third aspect, the invention provides a computer program product, the computer program comprising a series of instructions, the series of instructions such that when run on a control unit associated with a haptic feedback system according to the second aspect of the invention, the haptic feedback system operates such that the method steps according to the first aspect of the invention are carried out.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

In an example embodiment of the method, firstly the 3D position of a focal point is decided. A phased array is arranged to create an acoustic field, with the phases and amplitudes of each transducer calculated to achieve a high pressure at the focal point and a low pressure in surrounding areas. Two states then exist, firstly the focal point state, with the computed phases and amplitudes, and secondly the off state, with all of the transducers of a phased array set at zero amplitude. A frequency at which to modulate the feedback is then chosen in dependence on the desired feel of the feedback. Then a modulation waveform is chosen at the desired frequency, the modulation frequency chosen to minimise or reduce the audible sound produced at the focal point. An example modulation waveform is a cosine waveform. The modulation waveform is then applied to the operation of the transducers to interpolate between the two states identified above.

A more specific example, as applied to a particular haptic feedback system, is now described with reference to FIG. 1.

Figure 1:
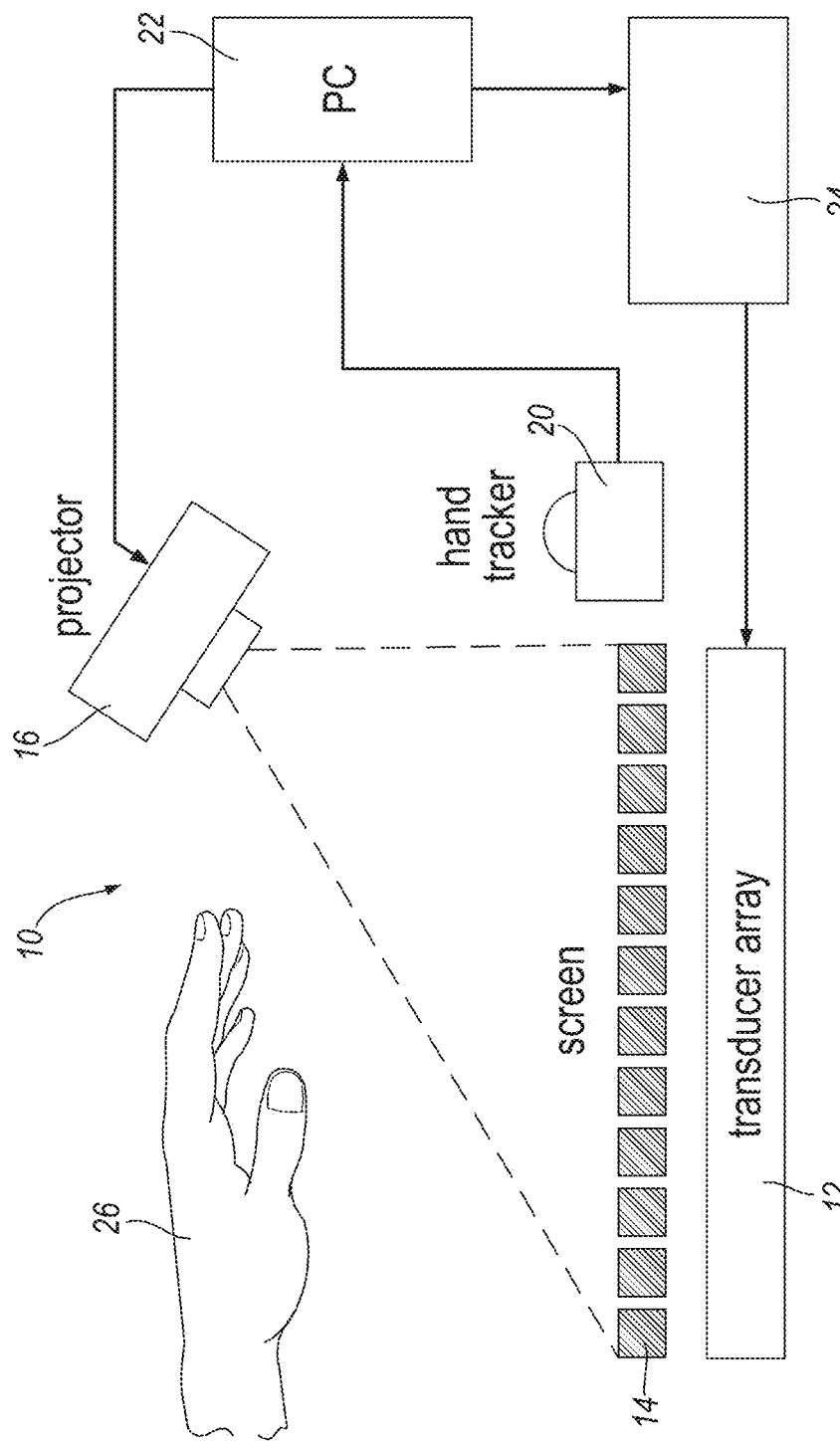
FIG. 1 shows a schematic view of a haptic feedback system according to a first embodiment of the invention.

FIG. 1 shows an example haptic feedback system 10 comprising a transducer array 12, a screen 14, a projector 16, a hand tracker 20, a PC 22, a driving unit 24, and a user's hand 26. The system 10 is shown to illustrate the invention, which is in no way limited to a particular system for producing haptic feedback using ultrasound. The transducer array 12 is located underneath the screen 14 and arranged such that pressure patterns may be transmitted through the screen 14 to a region above the screen 14. In this particular embodiment, the transducer array comprises 320 muRata MA40S4S transducers arranged in a 16×20 grid formation. Each transducer unit is 10 mm in diameter and the transducers are positioned with no gap between them in order to minimise the transducer array 12 footprint. The transducers produce a large amount of sound pressure (20 Pascals of pressure at a distance of 30 cm) and have a wide angle of directivity (60 degrees). The transducers are arranged to transmit ultrasound waves at a frequency of 40 kHz. The projector 16 is arranged to project visual information onto the screen 14 from above the screen 14 as shown. In an alternative embodiment, the projector may be placed between the transducer array and the screen, with the projection coming from below the screen.

A user interacts with this visual information and the movement and position of the user's hand 26 is tracked by the hand tracker 20. In this particular embodiment, the hand tracker 20 is a Leap Motion controller arranged to provide the 3D coordinates of the user's fingertips and palm at up to 200 frames per second. The system 10 is controlled by a PC 22, which sends control data to the projector 16, receives user data from the hand tracker 20, and controls the drive unit 24 for driving the transducer array 12. The PC 22 controls the driving unit 24 such that a pressure pattern is created in the region above the transducer array 12. In response to the hand movements of a user, the PC 22 may drive the driving unit 24 to cause the transducer array 12 to change the pressure pattern formed above the transducer array 12.

In order to compute the amplitude and phase of the acoustic wave each acoustic transducer must transmit for the desired pressure pattern to be created, an algorithm adapted from that proposed by Gavrilov ("The possibility of generating focal regions of complex configurations in application to the problems of stimulation of human receptor structures by focused ultrasound", L. R. Gavrilov, 2008, Acoustical Physics Volume 54, Issue 2, pp 269-278, Print ISSN 1063-7710) may be used. A volumetric box is defined above the transducer array 12. Within the box, a plurality of control points are defined. The control points may represent points where a maximum pressure value is desired, or points where minimum pressure values are desired. The pressure values are maximised or minimised by maximising or minimising the intensity of the ultrasound emitted by the transducer array 12 which is incident at the control points.

An algorithm is used to model the outputs of each of the transducers in the transducer array 12 required to obtain each of the desired pressure patterns which may be created within the volume defined above the transducer array 12. The algorithm may be split into three steps.

Firstly, the acoustic field generated by a single transducer is calculated to create a large modelled volume. Thereby, the phase and amplitude at any point within the modelled volume may be determined by offsetting the sample transducer for the position, phase, and amplitude, of each of the transducers in the real transducer array, and combining these values.

Secondly, the control points are defined in the 3D volume above the transducer array such that the control points take on the required distribution. The control points may be points of maximum intensity or minimum intensity (also known as null points). In addition to a 3D location, the desired modulation frequency of the maximum control points may be specified. Thirdly, the optimal phases are calculated using a minimum norm solver so that the resulting acoustic field is as close as possible to that specified by the control points. There may be more than one solution that will create an optimal focusing to the control points, but some solutions create a higher intensity than others. Solutions are therefore iteratively generated to find the one that creates the highest intensity.

The method according to an aspect of the invention comprises obtaining a modulation frequency that produces the required tactile sensation. For example, a relatively slow modulation frequency of 16 Hz would provide a slow, pulsing, sensation. A higher modulation frequency of 200 Hz would produce a near-continuous feeling. A modulation waveform is then selected at that frequency, which produces little or no audible sound at the feedback point. The modulation waveform may comprise an interpolation based on the required phase and amplitude of the waveform calculated as described above.

FIGS. 2 to 6 show a graph on the left hand side which represents the modulation waveform applied to the ultrasound emitted by an ultrasound transducer. The graph on the right hand side of the figures represents the audible waveform created at the focal point of the ultrasound transducer. Generally, the greater the amplitude and the more jagged the feedback waves created at the focal point, the louder the sound being produced will be.

Figure 2:
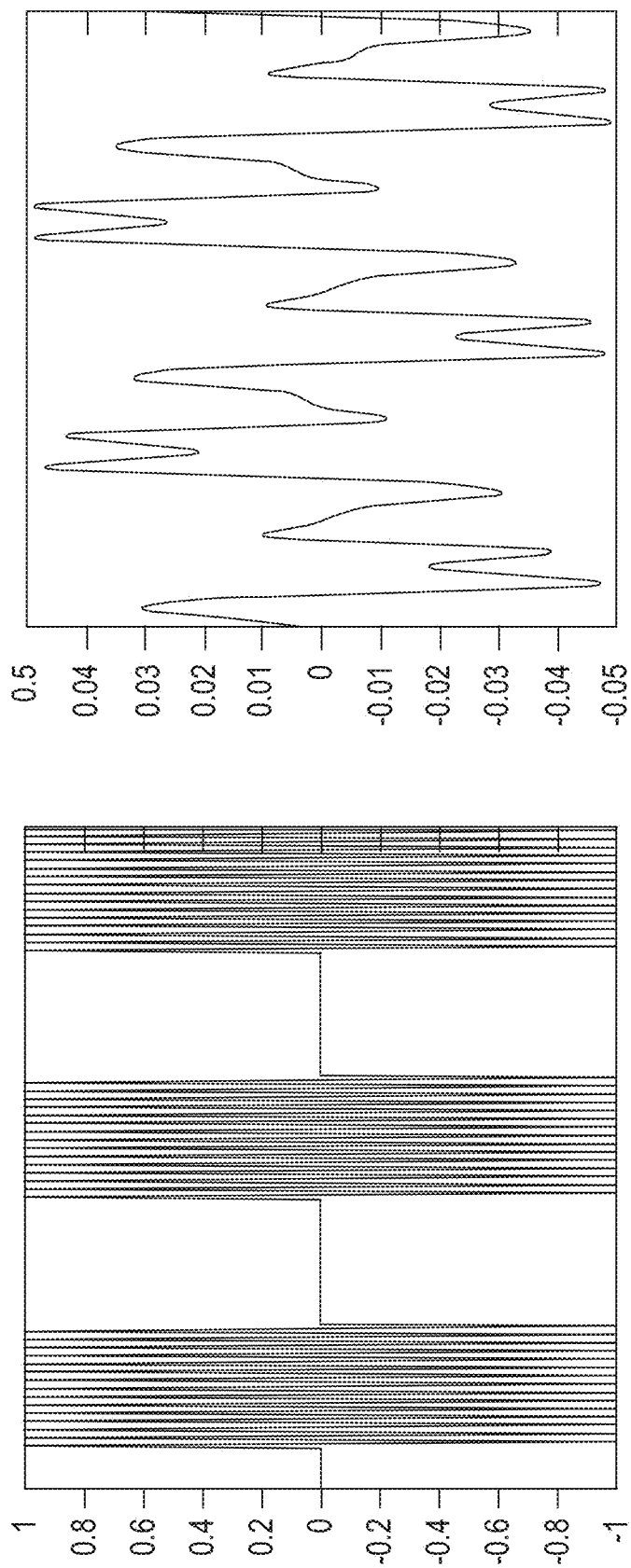
FIG. 2 shows a prior art square wave modulation pattern and the resultant waveform produced at the focal point.

In prior art systems, the modulation of the ultrasound corresponds to a simple square wave pattern, as shown in the graph on the left hand side of FIG. 2, where the array of transducers is simply turned on and off at the modulation frequency. The graph on the right hand side of FIG. 2 shows the waveform produced at the focal point of the ultrasound transducer when using a square wave modulation pattern. As is clear, the waveform is far from smooth and also the amplitude of the waveform is relatively high. This will result in a potentially loud and irritating sound being produced at the focal point of the haptic feedback system.

Figure 3:
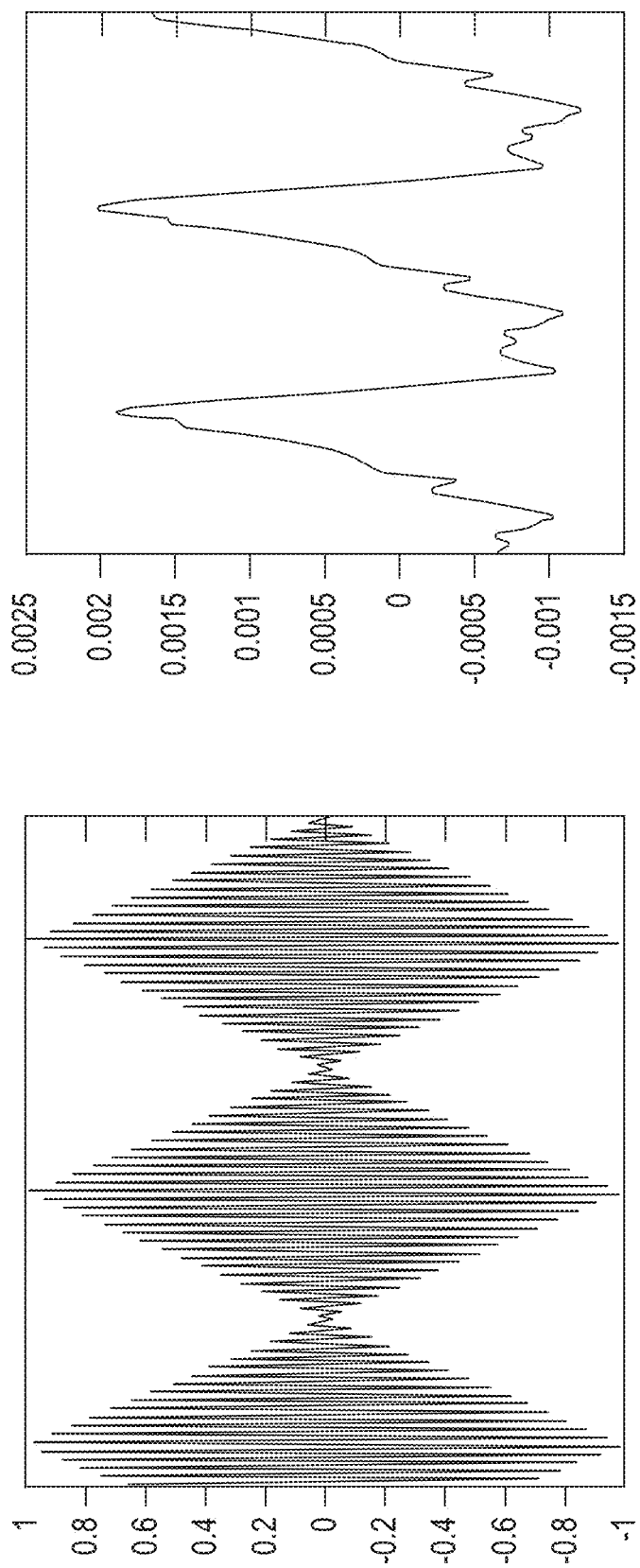
FIG. 3 shows a linear interpolation modulation pattern and the resultant waveform produced at the focal point according to a second aspect of the invention.

FIG. 3 shows an alternative modulation waveform, where the ultrasound is varied according to a linear interpolation. As can be seen in the graph on the right hand side of FIG. 3, the waveform produced at the focal point is smoother than that shown in FIG. 2, with an amplitude which is significantly smaller. Therefore, the sound produced at the focal point will be reduced compared to a square wave modulation.

Figure 4:
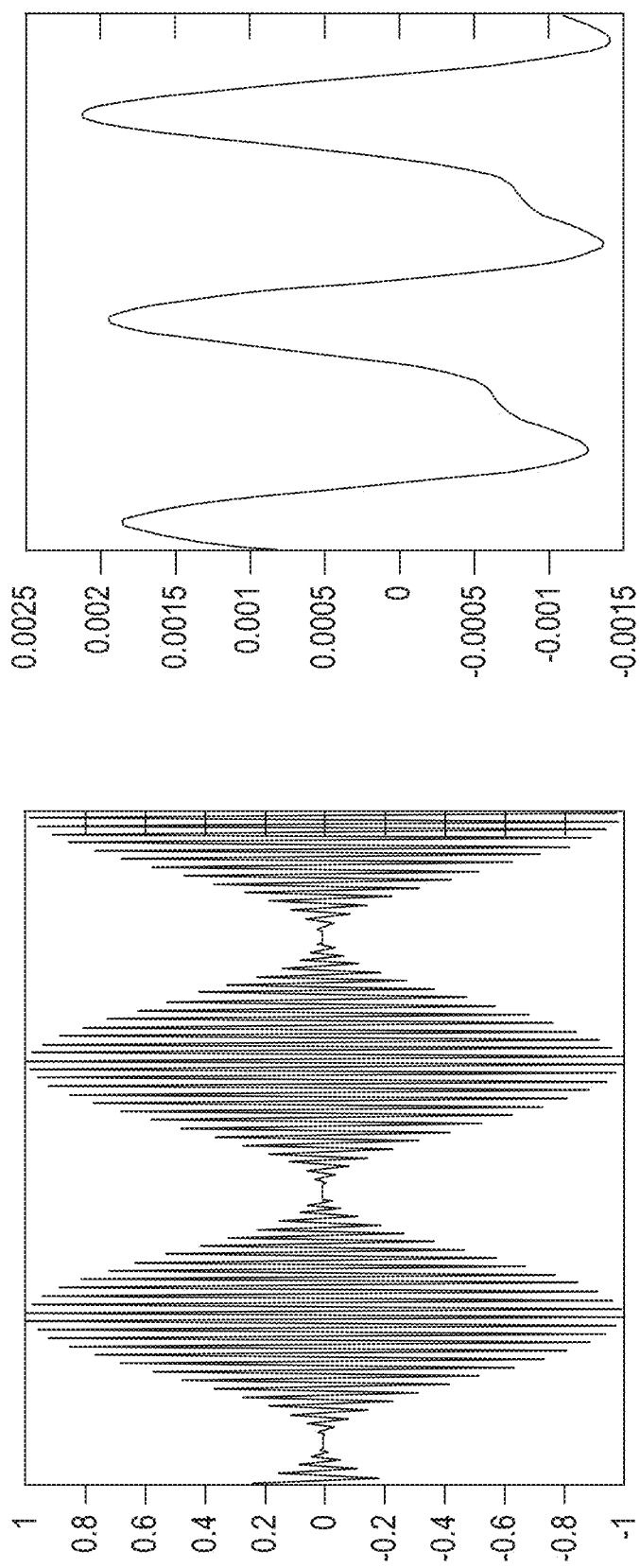
FIG. 4 shows a cosine interpolation modulation pattern and the resultant waveform produced at the focal point according to a third aspect of the invention.

FIG. 4 shows an alternative modulation waveform, where the ultrasound is varied according to a cosine interpolation. As can be seen in the graph on the right hand side of FIG. 4, the waveform produced at the focal point is smoother than that shown in FIG. 2, with an amplitude which is significantly smaller. Therefore, the sound produced at the focal point will be reduced compared to a square wave modulation.

Figure 5:
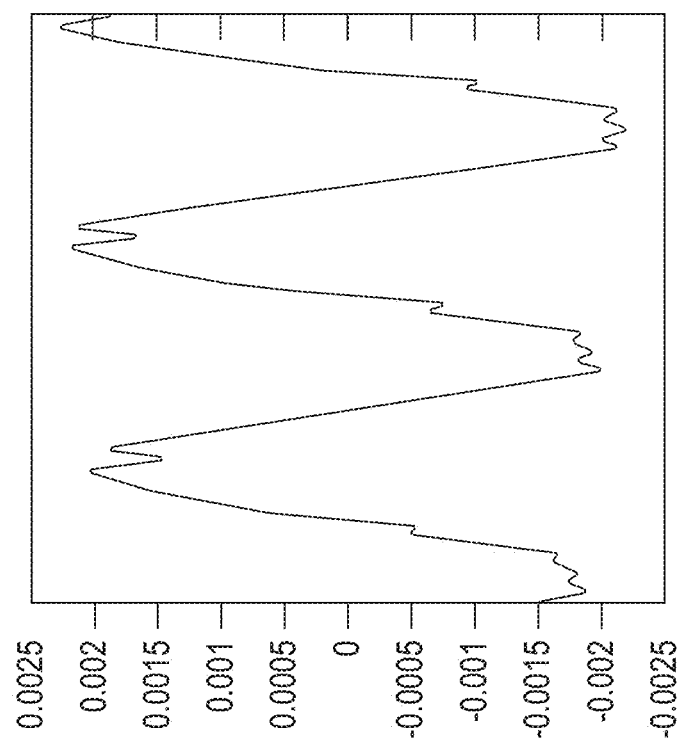
FIG. 5 shows a parametric speaker interpolation modulation pattern and the resultant waveform produced at the focal point according to a fourth aspect of the invention.
Figure 5:
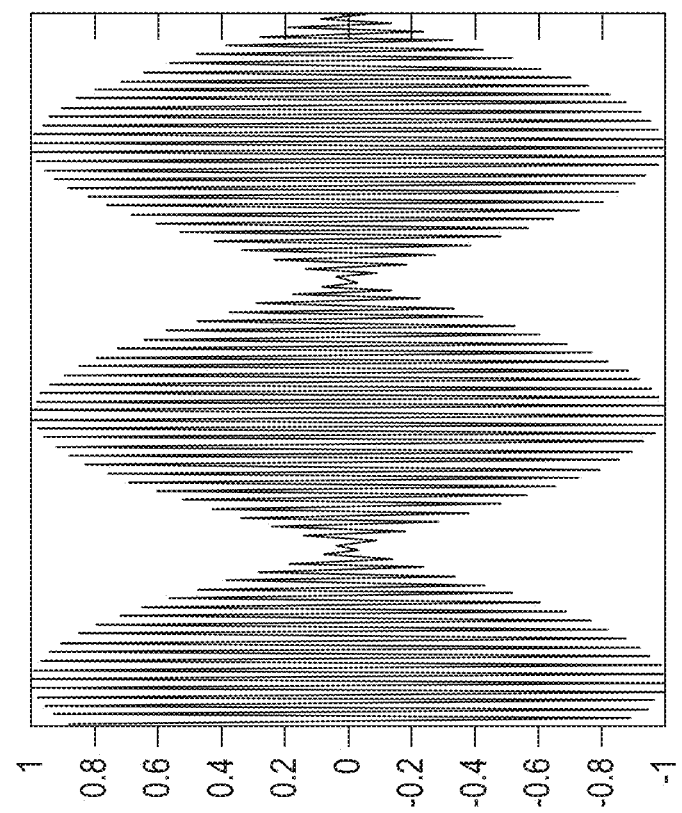

FIG. 5 shows an alternative modulation waveform, where the ultrasound is varied according to a parametric speaker interpolation. As can be seen in the graph on the right hand side of FIG. 5, the waveform produced at the focal point is smoother than that shown in FIG. 2, with an amplitude which is significantly smaller. Therefore, the sound produced at the focal point will be reduced compared to the square wave modulation.

Figure 6:
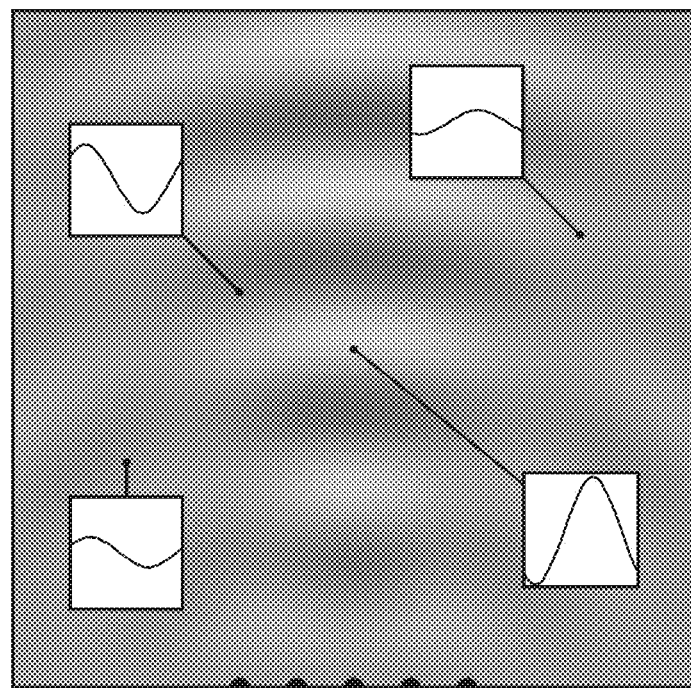
FIG. 6 shows an acoustic field generated at a focal point by a cosine interpolation modulation.
Figure 7:
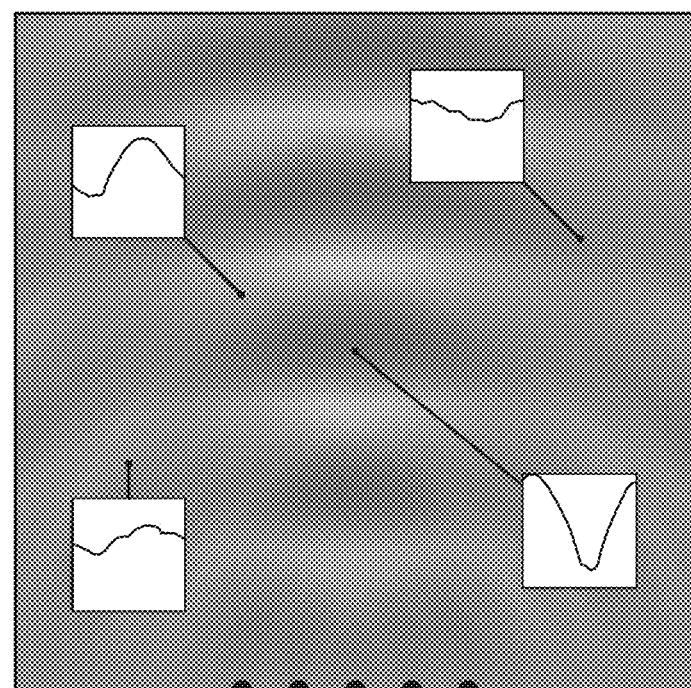
FIG. 7 shows an acoustic field generated at a focal point by a parametric speaker interpolation modulation.
Figure 8:
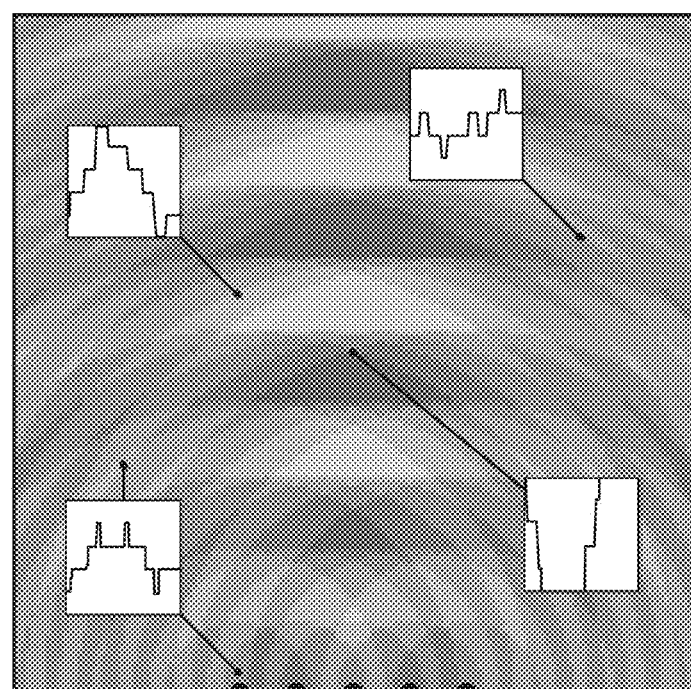
FIG. 8 shows an acoustic field generated at a focal point by a square wave modulation.

FIGS. 6, 7, and 8, show the acoustic field of audible waveforms that is produced from different modulation waveforms when a focal point is created from five point sources. The waveform at various points throughout the field are highlighted for comparison. FIG. 6 represents a cosine interpolation, FIG. 7 represents a parametric speaker interpolation, and FIG. 8 represents a square wave modulation method. As can be seen, FIG. 6 shows the smoothest, most uniform field. FIG. 7 shows a field which is not as smooth and uniform as FIG. 6, though still considerably smoother and more uniform than that shown in FIG. 8. Therefore it is evident that the cosine interpolation provides the optimum modulation compared to the others discussed. On investigation, the skilled person may discover alternative modulation waveforms which perform as well as or better than a cosine interpolation, whilst still falling within the scope of the present invention.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of creating haptic feedback using ultrasound comprising the steps of:
   using a plurality of ultrasonic transducers, generating a plurality of ultrasound waves, wherein at least two of the plurality of ultrasound waves form a focal point, wherein the focal point is a haptic feedback point that produces a tactile sensation;
   first modulating the generating of the plurality of ultrasound waves using a waveform to produce a haptic sensation at the haptic feedback point by obtaining a modulation frequency that produces the haptic sensation, which produces less audible sound pressure level than would be produced at the haptic feedback point when second modulating the generating of the plurality of ultrasound waves using a square wave modulation pattern.

2. The method as in claim 1, wherein the waveform is varied according to a linear interpolation.

3. The method as in claim 1, wherein the waveform is varied according to a cosine interpolation.

4. The method as in claim 1, wherein the waveform is varied according to a polynomial interpolation.

5. The method as in claim 1, wherein the waveform is varied according to trigonometric interpolation.

6. The method as in claim 1, wherein the waveform is varied according to a parametric speaker interpolation.

7. The method as in claim 1, wherein the square wave modulation pattern matches the modulation frequency of the waveform.

8. The method as in claim 7, wherein, at the focal point, a first peak amplitude of the first modulating is equal to a second peak amplitude of the second modulating.

9. The method as in claim 1, wherein the waveform comprises an interpolation of phase of at least one of the plurality of the ultrasonic transducers.

10. The method as in claim 1, wherein the waveform comprises an interpolation of amplitude of at least one of the plurality of the ultrasonic transducers.

11. The method of claim 1, wherein the generating a plurality of ultrasound waves use ultrasound with a frequency at or above 40 kHz.

12. The method of claim 1, wherein the first modulating the generating of the plurality of ultrasound waves uses a frequency from 1 Hz to 500 Hz.

13. The method of claim 1, further comprising: varying a position of the focal point.

14. The method of claim 13, wherein the position of the focal point is constantly varied.

15. The method of claim 13, wherein the position of the focal point oscillates about a central point.

16. A system comprising:
   a plurality of ultrasonic transducers for generation of a plurality of ultrasound waves, wherein at least two of the plurality of ultrasound waves form a focal point, wherein the focal point is a haptic feedback point that produces a tactile sensation;
   a first modulation of the generation of the plurality of ultrasound waves using a waveform to produce a haptic sensation at the haptic feedback point by obtaining a modulation frequency that produces the haptic sensation, which produces less audible sound pressure level than would be produced at the haptic feedback point during a second modulation of the generation of the plurality of ultrasound waves using a square wave modulation pattern.

17. The system as in claim 16, wherein the waveform is varied according to a linear interpolation.

18. The system as in claim 16, wherein the waveform is varied according to a cosine interpolation.

19. The system as in claim 16, wherein the waveform is varied according to a polynomial interpolation.

20. The system as in claim 16, wherein the waveform is varied according to trigonometric interpolation.

21. The system as in claim 16, wherein the waveform is varied according to a parametric speaker interpolation.

22. The system as in claim 16, wherein the square wave modulation pattern matches the modulation frequency of the waveform.

23. The system as in claim 22, wherein, at the focal point, a peak amplitude of the first modulation is equal to a peak amplitude of the second modulation.

24. The system as in claim 16, wherein the waveform comprises an interpolation of phase of at least one of the plurality of the ultrasonic transducers.

25. The system as in claim 16, wherein the waveform comprises an interpolation of amplitude of at least one of the plurality of the ultrasonic transducers.

26. The system of claim 16, wherein the generation of the plurality of ultrasound waves use ultrasound with a frequency at or above 40 KHz.

27. The system of claim 16, wherein the first modulation of the generation of the plurality of ultrasound waves uses a frequency from 1 Hz to 500 Hz.

28. The system of claim 16, further comprising: variance of a position of the focal point.

29. The system of claim 16, wherein the position of the focal point is constantly varied.

30. The system of claim 16, wherein the position of the focal point oscillates about a central point.

* * * * *